Sept. 22, 1959   W. K. BECKWITH   2,904,839
INJECTION MOLDING DIE AND NOZZLE COMBINATION
FOR FORMING SPRUE-FREE ARTICLES
Filed July 26, 1955   2 Sheets-Sheet 1
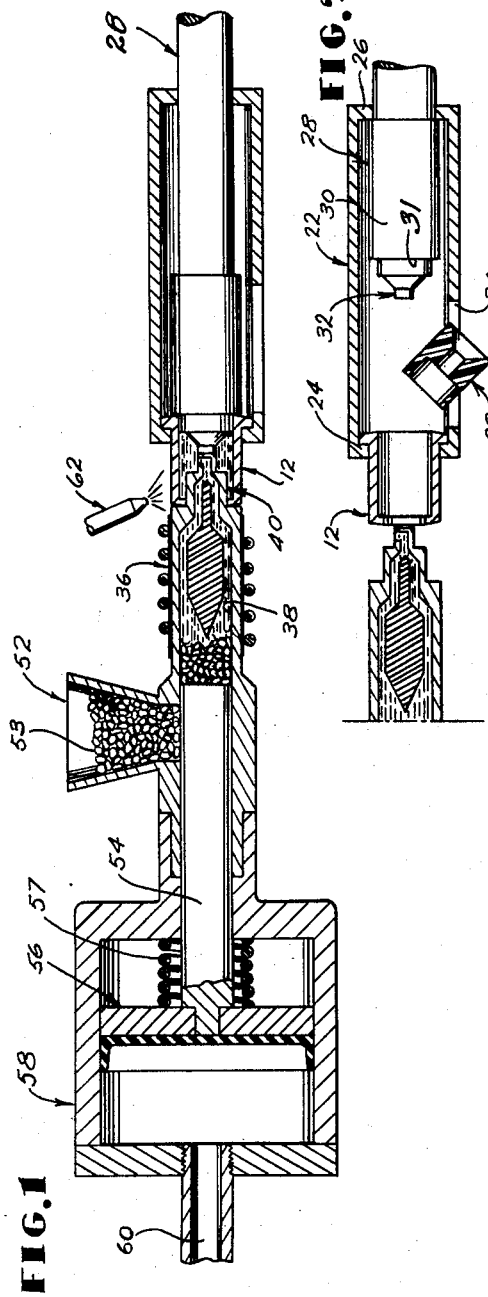
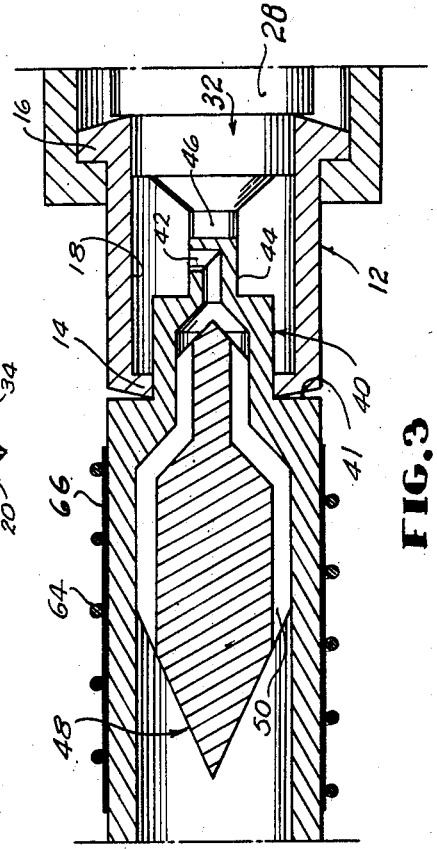
INVENTOR.
WENDELL K. BECKWITH
BY
ATTY.

Sept. 22, 1959 W. K. BECKWITH 2,904,839
INJECTION MOLDING DIE AND NOZZLE COMBINATION
FOR FORMING SPRUE-FREE ARTICLES
Filed July 26, 1955 2 Sheets-Sheet 2

INVENTOR.
WENDELL K. BECKWITH
BY
Ivan D. Tefft
ATTY.

United States Patent Office 2,904,839
Patented Sept. 22, 1959

2,904,839

INJECTION MOLDING DIE AND NOZZLE COMBINATION FOR FORMING SPRUE-FREE ARTICLES

Wendell K. Beckwith, Whitewater, Wis., assignor to The Parker Pen Company, Janesville, Wis., a corporation of Wisconsin Application July 26, 1955, Serial No. 524,460

2 Claims. (Cl. 18—30)

The present invention relates to injection molding apparatus.

The invention relates more particularly to such apparatus for molding small parts or articles with the elimination of sprues or gates, and the elimination of internal stress from the molded article.

In previously known methods of molding, a molded article was left with a sprue or gate which must be removed in some manner. This operation was not particularly uneconomical in the case where the article was large and the sprue consequently relatively small, but in the case of a very small, even miniature, article the sprue would be exceedingly large relative to the article itself, due to the limit to which dies could be reduced in size and still made practical. Removing the sprue from such a small article would be a difficult operation, and the unit cost of the articles exceedingly great.

A further disadvantage is that such sprues left on small articles would result in loss of a great amount of material, because of the size of the sprues relative to the articles.

An object of the invention is to provide die construction wherein one part is essentially of integral construction, and is withdrawn from the other parts as a single piece, whereby when the die parts are separted the sprue, which is then frozen separates from the article molded.

A further object is to provide a three element die comprising a hot core, a cold core and a sleeve wherein the hot core is part of the injection cylinder, and to provide lost motion means connecting the cold core and sleeve thereby permitting easy stripping of the molded article.

Another object is to provide a molding die made up of a plurality of parts, having novel construction for minimizing contact area between adjacent parts, for minimizing and thereby facilitating control of flow of heat between parts.

These and other objects will be apparent from the following detail description taken in conjunction with the accompanying drawings in which—

Figure 1 is a longitudinal sectional view of mold apparatus embodying the principles of the present invention;

Figure 2 is a view similar to the right-hand portion of Figure 1 showing the parts in a different position;

Figure 3 is a large sectional scale view of a portion of the core of Figures 1 and 2;

Figure 4:
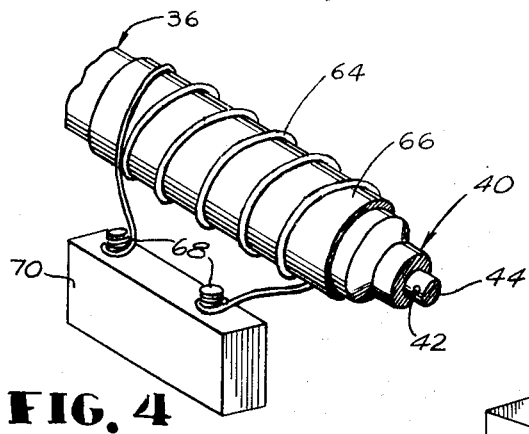
Figure 4 is a perspective view of a heating unit used in connection with the mold.

Referring in detail to the drawings, and particularly to Figures 1, 2 and 3, the die includes an apparatus embodying as a central element a die proper 12. This die is in the form of a sleeve having an inturned flange 14 (Figure 3) at one end and an outturned flange 16 at the opposite end. The inner surface 18 in the present case is cylindrical and defines the outer peripheral surface of the molded article 20 (Figure 2). Other forms and shapes of articles to be molded are illustrated in subsequent figures in the drawings. The molded article 20 includes an inner surface of special shape which is formed by other die parts to be described.

The die 12 is mounted in a die pull 22 in the form of a sleeve having an inturned flange 24 at one end engaging the flange 16 on the die. The opposite end of the die pull has an inturned flange 26 defining a central aperture in which a cold core 28 is received, the inner end of which is enlarged at 30 for engaging the flange 26 and pulling the latter and thereby the die. The extreme reduced inner end portion 32 extends into the die and forms and defines a portion of the inner surface of the molded article. The inner end of the enlargement 30 engages the adjacent end of the die 12 as shown in Figures 1 and 3. The die pull 22 has an aperture 34 through which the molded article falls upon its being ejected.

The apparatus includes an injection cylinder 36 separable from the remaining parts and which defines a portion of the die cavity. The space 38 in the cylinder leads into a hot core 40 which is a reduced diameter portion of the cylinder 36 and forms a shoulder 41 which engages the flange 14, the latter acting as a stop for the shoulder. The hot core 40 extends into the interior of the die proper 12 and has an injection hole 42 which in the present instance is formed in a further reduced extension 44. The injection hole 42 is directed radially outwardly and for a purpose to be pointed out later extends in a direction perpendicular to the direction of parting of the die. The reduced extension 44 engages a cooperating extension 46 formed on the inner end 32 of the cold core 28. The elements are so dimensioned that when these two parts are in engagement, the shoulders on the respective cores engage the flanges 14 and 16, or substantially engage them. The end surfaces of these flanges are tapered as more clearly shown in Figure 3 so as to reduce the area of contact with the shoulders 41 and 31 on the hot core and cold core respectively. The portions of the cores extending into the die 12 have contact engagement with the die at all points circumferentially of the die.

In the injection cylinder 36 is a torpedo 48 of generally cylindrical formation and having a plurality of longitudinally extending passages 50 for retaining the molten material closely adjacent the outer surface of the cylinder 36 in its flow into the die, and thus facilitating control of heat applied thereto for melting the material.

Rearwardly of the torpedo 48 is a feed hopper 52. A plunger 54 forces the molten material into the die, the plunger being connected to a piston 56 in a compression cylinder 58. The cylinder 58 has an inlet 60 for connection to a suitable and known source of supply of compressed air. Suitable means is provided for imposing constant air pressure on the piston 56 for actuating the plunger and forcing the material into the die. The fact of constant pressure on the piston 56 is of importance in the operation of the die apparatus embodying the principles of the present invention, as will be brought out later in detail.

A suitable cold air jet 62 of known form is provided for cooling the die 12. The heating and cooling means are controlled in a predetermined manner relative to the molding cycle as will be brought out more fully later.

Means is provided for heating the die and particularly the injection cylinder 36 thereof, which may be of the form shown more particularly in Figure 4. The heating means is designed for longitudinal adjustment and to this end includes a heating coil 64 surrounding a sheet of mica 66, with the ends of the coil connected to terminals 68 mounted on a block 70. The coil 64 snugly engages the sheet of mica 66 and the block and coil and mica form an assembly movable as a unit relative to the injection cylinder 36. The mica is dimensioned for free sliding movement on the injection cylinder. The heating coil melts the material 53, which in the present instance may be nylon, preparatory to its injection into the die 12, adjustment of the coil longitudinally of the injection cylinder and relative to the injection hole 42 controlling the manner in which the material is melted in the injecting operation.

The injecting operation of the material into the die is as follows. With the plunger 54 retracted under the action of the spring 57, the material 53 to be molded drops from the hopper 52 down into the space 38. Air pressure is then applied on the piston 56 and so maintained until the injecting operation is completed. While the air pressure is thus applied to the piston for urging the plunger 54 in injecting direction (to the right), heat is applied to the injection cylinder through the heating coil 54. The material 53 in the space 38 is melted and the pressure applied on the plunger 54 forces the melted material through the passages 50 and injection hole 42 into the die 12. Thereafter the cooling means 62 is brought into operation in a manner to be brought out later, and at the same time the heating means 64 is de-energized and after the material in the die 12 cools and hardens the pressure is relieved from the plunger 54, and the article ejected from the die.

Figure 5:
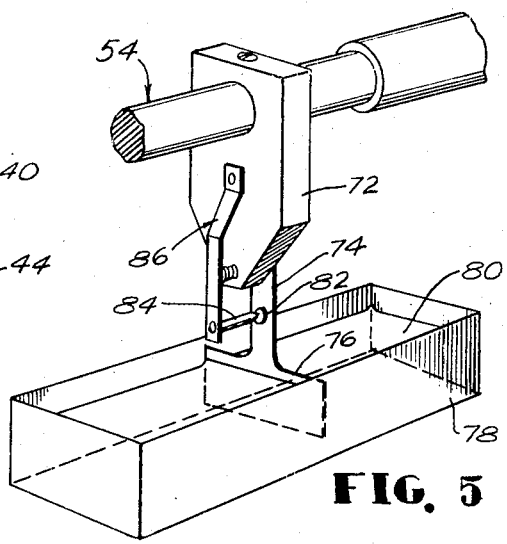
Figure 5 is a perspective view of a control device used with the mold.

Preferably, the cycle of injecting material into the die and heating and cooling operations are controlled automatically. A novel form of control means for this purpose is shown in Figure 5 which includes an arrangement for actuating the control means only when the plunger 54 moves rapidly or lunges but does not actuate the control means when it moves slowly. The control means includes a block 72 mounted on the plunger 54 and supporting a flexible leaf-like spring member or wafer 74. The flexible member 74 is suitably anchored at one end to the block 72 and at its other end in the form of an enlarged leaf 76 projecting in an open-top container 78 in which is a liquid 80 of relatively high viscosity. A contact element 82 is mounted on the flexible member 74 in position for engaging another control element 84; the elements 82 and 84 may be electrical contacts or terminal portions of a mechanical means for carrying out the control operation. The element 84 is mounted by a suitable bracket 86 on the block 72 and preferably is resilient for accommodating the flexing movement of the element 82.

The dimensions of the leaf 76 and the cross-section of the container 78 as well as the viscosity of the liquid 80 are so related that the flexible element will move through the liquid at a slow rate without substantial flexing, but if the plunger 54 moves rapidly so as to tend to move the flexible element 74 rapidly, the lower end 76 will be retarded by the liquid and the control or contact elements 82 and 84 brought into control engagement. This is brought into play in the injecting operation of the die apparatus of Figure 1. The constant pressure on the piston causes the plunger 54 to move slowly in response to changing positions of the material which may be because of either compacting or melting or both. The frozen material in the injection hole prevents the material from being injected into the die, but after the material is melted at the injection hole, the mass of molten material in the cylinder is rapidly injected into the die 12 and at that time it is desired to de-energize the heating element 64 and energize the cooling means 62. This cycle is accomplished by the control means of Figure 5, as described above.

In the molding operation of the apparatus, that is, considering a plurality of molding cycles, the control of the injection of molten material from the cylinder into the die 12 is effected through freezing and melting of the material in the space 38, and more particularly in the injection hole 42. The heating element 64 is positioned longitudinally of the injection cylinder 36 to accomplish that purpose and to this end is disposed in a position effectively remote from the injection hole 42 and in such position first melts the material directly under it. The heat progresses through the material in a direction toward the injection hole 42 and consequently the material progressively melts in that direction. As a consequence, when the material in the injection hole 42 is ready to melt, all of the material behind it is molten; then with constant pressure applied to the piston 56, and when the material in the injection hole 42 actually melts, the mass of material in the space 38 is forced rapidly into the die 12 and fills the die. The capacity of the space 38 is, of course, dimensioned to enable such filling of the die.

The injection cylinder 36 forms an actual part of the die, that is, it forms and defines a substantial portion of the cavity and hence the surface on the molded article. The extensions 40 and 44 extend actually into the die 12 and in the present instance form and define inner surfaces of a hollow, molded article 20. There are no gates or runners between the injection cylinder and die proper and upon removal of the injection cylinder 36, which includes the hot core 40, the surfaces formed are stripped clean. To the latter end the injection hole 42 being directed in a direction perpendicular to the direction of parting of the die, there is no possibility of gates or sprues being left on the molded article. Thus a small and even miniature part or article can be molded by the present process. The article 20 is actually an element of the fountain pen of my co-pending application Serial No. 324,090, filed December 4, 1952 now Patent No. 2,762,337. The piece is substantially 5/16" in diameter. The miniature character of the article is therefore apparent. If any gates or sprues were left on the article, it will be seen that an excessive amount of material would be wasted in view of the miniature size of the molded article. Serious waste of time would also be involved in removing the gates or sprues from the molded article.

These considerations are determined all the more important in view of the fact that the articles molded are of intricate shapes having relatively complicated internal surfaces, but are nevertheless formed without gates or sprues or other external enlargements formed thereon.

As was stated above, another important advantage of the invention is that articles can be molded without internal stress in the finished articles. This is accomplished by the fact that the material in the die remains in fully molten condition until the die is filled whereby the material freely flows and conforms to the shape of the die without applied pressure. This is accomplished by the kind of melting and injecting cycles referred to above. The material in the injection hole 42 remains in frozen form up to the last, i.e., until all of the material behind it is molten. When this small portion in the injection hole 42 is finally melted, the constant pressure applied to the piston brings about sudden and complete filling of the die. This action is so fast that the die is completely filled with fully free flowing material before any of the material has had an opportunity to freeze. A certain amount of heat is transmitted to the die 12 through its contact with the injection cylinder 36 and the hot core portion 40 thereof. The die 12 therefore is heated at least to an extent and this aids in maintaining the material in the die heated and in molten condition until it is deliberately cooled. This phenomenon therefore aids in the provision of molded articles without internal stress. It is therefore in the compass of the present invention to apply heat to the mold or die in the molding operation for the purpose of maintaining the molding material molten until the material has finally conformed to the die so that the completed article is free of internal stress.

With respect to control of the condition of the molten material in the space 38, if the heating element is retracted (to the left of Figure 1) it tends to melt a substantial portion of the material at a point remote from the injection hole 42 so as to assure that all of the material is brought up to the desired temperature before the material in the injection hole 42 itself is melted and freed to flow into the die. Movement of the heating coil in the opposite direction will tend to melt the material in the injection hole 42 prematurely because a superabundance of heat is transmitted to that portion before all of the material behind it is brought up to the desired temperature. The length of the heating element also is selected as desired to provide the required total heat. The condition of heating of the material may be determined by inspection of the molded article and the die, i.e., to determine whether there is excessive flashing occurring, or if there is cold flowing, etc.

In the cycling operation in which the control means of Figure 5 is utilized to control the heating element 64 and the cooling means 62, the contact elements 82 and 84 bring into play either electrical or mechanical means for de-energizing the heating element 64 and energizing the cooling means 62. The cooling of the molded article occurs in a matter of seconds, and this phase of the cycle may be sequentially timed so that cooling of the die takes place only after the piston or plunger lunges and the die is filled. Thereafter the molded article may be ejected and the material in the cylinder 36 will be retained therein by the frozen material in the injection hole 42. The molded article may be stripped by withdrawing the cold core 28 (to the right of Figure 1), the enlargement 30 engaging the flange 26 and actuating the die pull 22 to pull the die 12 from the hot core 40. In this stripping operation the cold core 28 will have withdrawn from the molded article before the die is withdrawn from the hot core because of the interlock between the molded article and the sprue in the injection hole 42. After the cold core is thus retracted from the molded article, it operates the die pull as explained above and strips the molded article from the hot core. Thereafter the molded article on cooling further, shrinks and is easily ejected from the die 12 by suitable means such as an air blast or an ejector pin.

Since the injecting cylinder 36 forms actually a part of the die, the die 12 itself is self-locating on the injecting cylinder.

In the form of apparatus described above, the injection of the material into the die takes place radially outwardly and the injection hole is located at a position offset from the parting lines or planes of the die. None of the parting lines or planes intersect the injection hole. The injection hole is defined by the surface of the injection cylinder or hot core which is unitary and integral. This same surface forms a significant portion of the surfaces of the molded article and when the hot core is removed from the molded article, the sprue or the material in the injection hole 42 is sheared from the molded article, with no excess or protuberance of material attached to the molded article. The critical-dimension surfaces of the molded article are formed and defined by integral surfaces of the die parts, the three parts 12, 40 and 32. The parting lines or planes between the parts of the die lie essentially in transverse planes. The provision of the novel arrangement of injecting material into the die from the inside out, rather than from the outside in, in itself eliminates all runners and gates from the molded article.

The injection hole 42, it will be noted, is relatively small and for this reason cold slugging is avoided. Even if a small particle in the center of the sprue in the injection hole 42 should not be entirely melted when the injection hole is opened in the injection operation, this particle, because of the small dimensions of the injection hole, will be relatively small in mass as compared with the mass of material behind it and it will, accordingly, be melted in the die if it is not already melted in the injection hole before the release of the material into the die.

I claim:

1. An annular injection die for molding a sprue-free annular article comprising: a sleeve defining the outer surface of the article and having a first flange at one end thereof and a second flange at the other end thereof; an injection cylinder abutting said first flange and having a reduced hot core extending into said sleeve from said one end thereof defining a first portion of the inner surface of the article, said hot core having an injection hole therein opening into the cavity of the die transversely of the axis of the die; a cold core extending into said sleeve from said other end thereof abutting said hot core and defining a second portion of the inner surface of the article, said core having a shoulder engageable with said second flange to hold said first flange in abutment with said injection cylinder; said sleeve and said cold core being movable away from and toward said hot core; and a lost motion means having a first lip engageable with said second flange and having a second lip engageable with said cold core connecting said sleeve and said cold core in lost motion relation for separating them from said hot core upon moving said cores apart to strip the article from the die.

2. An annular injection die for molding a sprue-tree annular article comprising: a sleeve defining the outer surface of the article and having an inturned flange at one end thereof and an outturned flange at the other end thereof; an injection cylinder abutting said inturned flange and having a reduced hot core extending into said sleeve from said one end defining a first portion of the inner surface of the article, said hot core having an injection hole therein opening into the cavity of the die perpendicularly of the axis of the die; a cold core extending into said sleeve from said other end abutting said hot core and defining a second portion of the inner surface of the article, said cold core having a shoulder engageable with said outturned flange to hold said inturned flange in abutment with said injection cylinder; said sleeve and said cold core being movable away from and toward said hot core; and a lost motion die pull having a first inturned lip engageable with said outturned flange and having a second inturned lip engageable with said cold core connecting said sleeve and said cold core in lost motion relation for separating them from said hot core upon moving said cold core away from said hot core to strip the article from the die.

References Cited in the file of this patent

UNITED STATES PATENTS

| | | |
|---|---|---|
| 2,243,968 | Lester | June 3, 1941 |
| 2,296,296 | Shaw | Sept. 22, 1942 |
| 2,358,857 | Gits | Sept. 26, 1944 |
| 2,431,349 | Stacy | Nov. 25, 1947 |
| 2,442,368 | Maynard | June 1, 1948 |
| 2,522,134 | Sayre | Sept. 12, 1950 |
| 2,627,630 | Farley | Feb. 10, 1953 |
| 2,777,164 | Strahm | Jan. 15, 1957 |

FOREIGN PATENTS

| | | |
|---|---|---|
| 595,960 | Germany | Apr. 24, 1934 |